D. W. TOZIER.
FISH SCREEN AND BARRIER.
APPLICATION FILED AUG. 21, 1915.
1,178,428.
Patented Apr. 4, 1916.
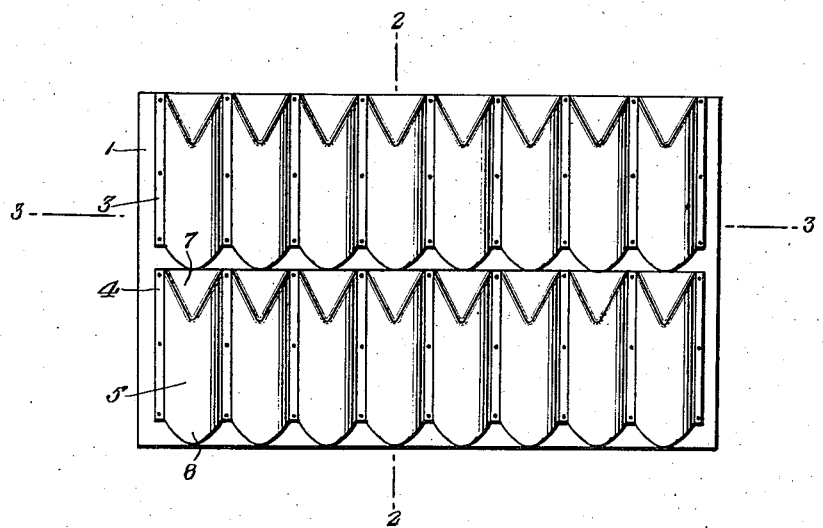
Fig. 1.
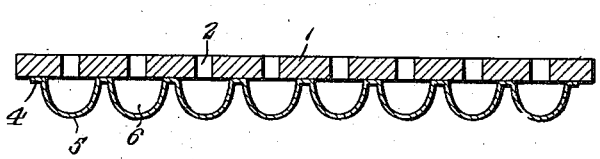
Fig. 2.
Fig. 3.
Witness
J. H. Crawford
Inventor
D. W. Tozier,
By Victor J. Evans
Attorney

UNITED STATES PATENT OFFICE.

DAVID W. TOZIER, OF KELLIHER, MINNESOTA.

FISH SCREEN AND BARRIER.

1,178,428.  Specification of Letters Patent.  Patented Apr. 4, 1916.

Application filed August 21, 1915. Serial No. 46,720.

*To all whom it may concern:*

Be it known that I, DAVID W. TOZIER, a citizen of the United States, residing at Kelliher, in the county of Beltrami and State of Minnesota, have invented new and useful Improvements in Fish Screens and Barriers, of which the following is a specification.

This invention relates to combined fish screens and barriers and the principal object of the invention is to provide a simply constructed and inexpensive device which will be effective in preventing the fish from traveling from an open stream to irrigation trenches or similar places and which is constructed in such manner as to outstand all strains imposed upon it.

Further objects of the invention will appear as the following specific description is read in connection with the accompanying drawings which form a part of this application, and in which:—

Figure 1 is a perspective view looking at the front of the device. Fig. 2 is a vertical sectional view taken on the line 2—2 of Fig. 1. Fig. 3 is a horizontal section taken on the line 3—3 of Fig. 1.

Referring more particularly to the drawings, 1 represents the body or back plate of the device which is preferably constructed of suitable metal treated to prevent rust or corrosion and provided with a plurality of rows of apertures or discharge ports 2. Secured to the back plate are a plurality of plates indicated at 3 and 4. These plates are spaced away from each other vertically and have at intervals raised portions or ribs 5 which produce vertical channels 6 communicating with the discharge ports or apertures 2. The upper end of the ribs as shown at 7, are closed to shut off the upper end of the channel 6 while the lower end of each rib depends below the lowermost opening of each vertical series or row of openings as shown at 8, so that all of the openings are effectively concealed, and yet continuously open to the passage of water from the stream to the ditch. The fish failing to see the openings which are of such size as to prohibit their passage do not make any attempt to pass the barrier and the minnows or small fish are diverted by the ribs which conceal the openings.

What is claimed is:—

A fish screen or barrier comprising a plate having a plurality of rows of apertures, separated plates extending across the first mentioned plate and having raised ribs covering said apertures, said ribs forming channels and being closed at their upper ends and depending below the lowermost aperture of each row of apertures.

In testimony whereof I affix my signature in presence of two witnesses.

DAVID W. TOZIER.

Witnesses:
FLORENCE KOLBE,
E. J. TAYLOR.